(12) United States Patent
Sonneland et al.

(10) Patent No.: US 10,527,745 B2
(45) Date of Patent: Jan. 7, 2020

(54) PROCESSING OF GEOLOGICAL DATA

(75) Inventors: Lars Sonneland, Tananger (NO);
Hallgrim Ludvigsen, N-Stavanger (NO); Bjorn Harald Fotland, N-Stavanger (NO)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 817 days.

(21) Appl. No.: 13/514,646

(22) PCT Filed: Nov. 15, 2010

(86) PCT No.: PCT/IB2010/002937
§ 371 (c)(1),
(2), (4) Date: Nov. 7, 2012

(87) PCT Pub. No.: WO2011/070413
PCT Pub. Date: Jun. 16, 2011

(65) Prior Publication Data
US 2013/0085676 A1   Apr. 4, 2013

(30) Foreign Application Priority Data

Dec. 8, 2009 (GB) .................................. 0921499.0

(51) Int. Cl.
*G01V 1/40* (2006.01)
*G01V 1/34* (2006.01)
(Continued)

(52) U.S. Cl.
CPC ................ *G01V 1/40* (2013.01); *G01V 1/301* (2013.01); *G01V 1/34* (2013.01); *G01V 1/48* (2013.01); *E21B 49/00* (2013.01)

(58) Field of Classification Search
USPC .......................................................... 702/11
See application file for complete search history.

(56) References Cited

U.S. PATENT DOCUMENTS 4,781,062 A * 11/1988 Taylor ........................ 73/152.16
4,804,051 A *  2/1989 Ho ............................. E21B 7/04
                                                          175/26
(Continued)

FOREIGN PATENT DOCUMENTS

GB         1092487 A      11/1967
GB         2444506 A       6/2008
(Continued)

OTHER PUBLICATIONS

International Search Report & Written Opinion issued in PCT/IB2010/002937 dated Aug. 22, 2011; 9 pages.

*Primary Examiner* — Paul D Lee

(57) ABSTRACT

A method of processing geological data comprising a plurality of geological surfaces within a geological volume is provided. The method includes the steps of: (i) specifying a well trajectory which extends through the geological volume; (ii) identifying the geological surfaces within the volume which are intersected by the trajectory; (iii) determining, for each intersected surface, the depth, the dip angle and the dip direction of the surface at the point of intersection with the trajectory; and (iv) predicting a well log for the trajectory, the log specifying the depths, dip angles and dip directions of the intersected geological surfaces.

12 Claims, 2 Drawing Sheets

(51) Int. Cl.
*G01V 1/30* (2006.01)
*G01V 1/48* (2006.01)
*E21B 49/00* (2006.01)

(56) References Cited

U.S. PATENT DOCUMENTS

| | | | |
|---|---|---|---|
| 6,594,584 B1* | 7/2003 | Omeragic et al. | 702/9 |
| 6,856,910 B2 | 2/2005 | Goswami et al. | |
| 7,203,342 B2 | 4/2007 | Pedersen | |
| 7,248,539 B2 | 7/2007 | Borgos et al. | |
| 2002/0103630 A1* | 8/2002 | Aldred | E21B 44/00 703/10 |
| 2006/0038571 A1* | 2/2006 | Ostermeier | G01V 3/38 324/338 |
| 2008/0236270 A1 | 10/2008 | Denichou et al. | |
| 2009/0157361 A1 | 6/2009 | Toghi et al. | |
| 2010/0161228 A1* | 6/2010 | Heliot et al. | 702/10 |
| 2011/0106514 A1* | 5/2011 | Omeragic et al. | 703/10 |

FOREIGN PATENT DOCUMENTS

| | | | |
|---|---|---|---|
| WO | 9837437 A1 | 8/1998 | |
| WO | 2008086352 A1 | 7/2008 | |

* cited by examiner

PROCESSING OF GEOLOGICAL DATA

FIELD

The present invention relates to a method of processing geological data.

BACKGROUND

The characterisation of subsurface strata is important for identifying, accessing and managing reservoirs. The depths and orientations of such strata can be determined by seismic surveying, which is generally performed by imparting energy to the earth at one or more source locations, for example, by way of controlled explosion, mechanical input etc. Return energy is then measured at surface receiver locations at varying distances and azimuths from the source location. The travel time of energy from source to receiver, via reflections and refractions from interfaces of subsurface strata, indicates the depth and orientation of the strata.

U.S. Pat. No. 7,248,539 discloses a method for automated extraction of surface primitives from seismic data. For example, one embodiment of the method of U.S. Pat. No. 7,248,539 involves defining, typically with sub-sample precision, positions of seismic horizons through an extrema representation of a 3D seismic input volume; deriving coefficients that represent the shape of the seismic waveform in the vicinity of the extrema positions; sorting the extrema positions into groups that have similar waveform shapes by applying classification techniques with the coefficients as input attributes using unsupervised or supervised classification based on an underlying statistical class model; and extracting surface primitives as surface segments that are both spatially continuous along the extrema of the seismic volume and continuous in class index in the classification volume.

The characterisation of fractures in reservoir formations can also be important. For example, fractures intersecting drilled wells may assist the flow of hydrocarbons from the reservoir and so increase production. Conversely, fractures may allow water to flow into wells and so decrease production.

WO 2008/086352 describes a methodology for mapping fracture networks from seismic data using fracture enhancement attributes and fracture extraction methods. For example, borehole data can be used to determine modes of fracture, and in particular whether fracture clusters or networks would be detectable in surface seismic data. It can also provide information on fracture network inclination (i.e. average inclination of the fractures in a network relative to the horizontal) and strike azimuth (i.e. average direction of intersection of the fractures in a network relative to the horizontal).

Discontinuity extraction software (DES), for example as described in U.S. Pat. No. 7,203,342, may then be utilised to extract 3D volumes of fracture networks from surface seismic data. Extracted fracture networks may be parameterised in terms of the strength of their seismic response, and on their length, height and width.

SUMMARY

Although, geological surfaces, such as strata horizons and faults, can be characterised using such known approaches, there remains, among other things, a problem that the characterisation may not allow drilling rig operators readily to make decisions based upon it.

Accordingly, a first aspect of the invention provides a method of processing geological data comprising a plurality of geological surfaces within a geological volume, the method including the steps of:
specifying a well trajectory which extends through the geological volume;
identifying the geological surfaces within the volume which are intersected by the trajectory;
determining, for each intersected surface, the depth, the dip angle and the dip direction of the surface at the point of intersection with the trajectory; and
predicting a well log for the trajectory, the log specifying the depths, dip angles and dip directions of the intersected geological surfaces.

As is conventional, the dip angle at a point on a geological surface is the angle below the horizontal of a tangent plane to the surface at that point, while the dip direction at a point on a geological surface is the direction of maximum dip at that point projected onto the horizontal.

By predicting a well log for the specified well trajectory, characteristics of the geological surfaces can be presented in a form that is relatively straightforward to interpret, particularly for drilling rig operators. For example, the predicted well log focuses on those geological surfaces which an operator, in practice, might actually encounter when drilling a well.

The method may have any one or, to the extent that they are compatible, any combination of the following optional features.

Typically, the method is performed using a computer system, i.e. it is computer-based, which allows the method to be automated. For example, the geological data and the specified well trajectory can be supplied to a processor. The processor can be used to: identify the intersected geological surfaces; and determine the depth, the dip angle and the dip direction of the surface at the point of intersection with the trajectory. The well log can then be predicted by and outputted from the processor.

The geological surfaces can include horizons and/or faults.

The method may further comprise the step of graphically displaying the predicted well log, for example on a display screen. The well log may be displayed, for example as a tadpole plot. In a tadpole plot, dip angle is plotted against depth with a line segment extending from each plotted point in the dip direction. However, the well log may be displayed in alternative ways. For example, each intersected surface may be represented as a disc having the relative position, dip angle and dip direction that the intersected surface would have in the well.

The method may further comprise the steps of:
obtaining an experimental well log for a well having the specified trajectory; and
correlating the predicted well log with results from the experimental well log.

The experimental well log results can provide the depths, dip angles and/or dip directions of intersected geological surfaces. By correlating these results with the predicted well log, the geological surfaces within the geological volume can be updated in the light of actual well conditions.

A second aspect of the present invention provides a method of processing seismic data including the steps of:
performing seismic tests to obtain seismic data for a geological volume;
labelling the seismic data to obtain geological data comprising a plurality of geological surfaces within the geological volume; and performing the method of the first aspect (optionally including any one or, to the extent that they are compatible, any combination of the optional features of the first aspect).

For example, the labelling step can be performed using approaches disclosed in U.S. Pat. No. 7,248,539, WO 2008/086352 and U.S. Pat. No. 7,203,342.

A third aspect of the present invention provides a method of controlling a well drilling operation including the steps of:

performing the method of the first or second aspect (optionally including any one or, to the extent that they are compatible, any combination of the optional features of the first aspect) one or more times to predict one or more well logs;

using the predicted well log or logs to select a well trajectory; and drilling a well having the selected trajectory.

For example, the predicted trajectory which suggests the best drilling outcome may be selected.

A fourth aspect of the present invention provides a method of controlling a well drilling operation including the steps of:

performing the method of the first or second aspect (optionally including any one or, to the extent that they are compatible, any combination of the optional features of the first aspect) to predict a well log;

drilling a well having the specified trajectory, measurement while drilling being performed during the drilling of the well; and correlating the predicted well log with results from the measurement while drilling.

Measurement while drilling (MWD) is a technique by which measurements are taken while drilling (e.g. using special tools which are part of the bottom hole assembly) and the measurements are transmitted to the surface.

The MWD results can provide the depths, dip angles and/or dip directions of intersected geological surfaces. By correlating these results with the predicted well log, the operator can determine the accuracy of the predicted well log. If there are discrepancies between the results and the predicted well log, the operator can update the geological surfaces within the geological volume in the light of actual well conditions. If necessary, the operator can also make changes to the drilling operation itself.

Further aspects of the invention provide (i) a computer system, (ii) a computer program product carrying a program, and (iii) a computer program, each for performing the method of the first aspect (optionally including any one or, to the extent that they are compatible, any combination of the optional features of the first aspect).

For example, a computer system for processing geological data comprising a plurality of geological surfaces within a geological volume can include:

(i) a computer-readable medium or media which:
 (a) store the geological data, and
 (b) specify a well trajectory which extends through the geological volume; and
(ii) a processor configured to:
 (a) identify the geological surfaces within the volume which are intersected by the trajectory;
 (b) determine, for each intersected surface, the depth, the dip angle and the dip direction of the surface at the point of intersection with the trajectory; and
 (c) predict a well log for the trajectory, the log specifying the depths, dip angles and dip directions of the intersected geological surfaces.

The computer system may include an output device, such as a display screen, for graphically displaying the predicted well log.

A computer program product may be a storage medium carrying computer readable instructions for processing geological data comprising a plurality of geological surfaces within a geological volume, the instructions including:

specify a well trajectory which extends through the geological volume;

identify the geological surfaces within the volume which are intersected by the trajectory;

determine, for each intersected surface, the depth, the dip angle and the dip direction of the surface at the point of intersection with the trajectory; and predict a well log for the trajectory, the log specifying the depths, dip angles and dip directions of the intersected geological surfaces.

BRIEF DESCRIPTION OF THE DRAWINGS

Embodiments of the invention will now be described by way of example with reference to the accompanying drawings in which.

DETAILED DESCRIPTION

Figure 1:
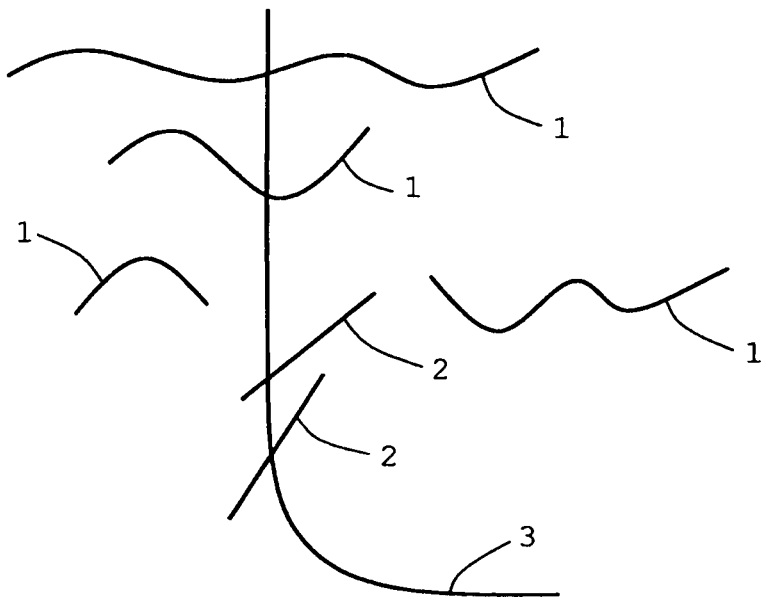
FIG. 1 shows schematically a cross-section through a geological volume.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention, it being understood that various changes may be made in the function and arrangement of elements without departing from the scope of the invention as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the FIGURE. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

A seismic data volume can be treated as being a collection of horizon surfaces (often referred to as seismic events or strata) that are defined at the positions of seismic data zero-crossings, maximum or minimum values. Known methods by which such a sparse surface representation of a seismic data volume may be obtained are diverse, including manual interpretation, connected component labelling of extrema cubes and extrema classification.

Extrema detection, in particular, is a well known concept in signal and image processing, and there are many algorithms and techniques for performing such detection. For example, applying the extrema classification method discussed in U.S. Pat. No. 7,248,539, it is possible to obtain a sub-sample precision representation of all extrema within a seismic volume using volume reflection spectral decompositions (as discussed in WO 98/37437).

A particular advantage of using the approach of U.S. Pat. No. 7,248,539 for extracting connected horizon surfaces is that it can provide robust and versatile solutions even when faulted or chaotic regions are encountered.

More generally, extrema classification methods for horizon extraction can provide very good characterization of the local signal shape, as well as shape similarity throughout the area of interest.

Analysis, for example through calculation of seismic attributes, and information from well logs (as described in WO 2008/086352), can also reveal 3D sub-volumes containing fracture networks. In particular, fracture enhancement attributes enhance signals caused by fractures in seismic data.

Having identified sub-volumes of interest, fracture extraction can be performed on the fracture enhancement attributes for each vintage, to obtain a geometrical representation of the fracture networks. Fracture extraction can proceed by identifying discontinuities in the fracture enhancement attribute. One example of a fracture network extraction procedure is described in U.S. Pat. No. 7,203,342 and applies swarm intelligence through the deployment of artificial ants into the attribute volumes.

However, the geological volumes resulting from these procedures can be populated with large numbers of geological surfaces, making the task of interpretation difficult. In particular, a drilling rig operator may be more interested in knowing what geological structures will be encountered on a particular well trajectory than on having an overview of an entire geological volume.

Thus the present invention provides a method of processing geological data to provide a predicted a well log for a specified trajectory.

Figure 2:
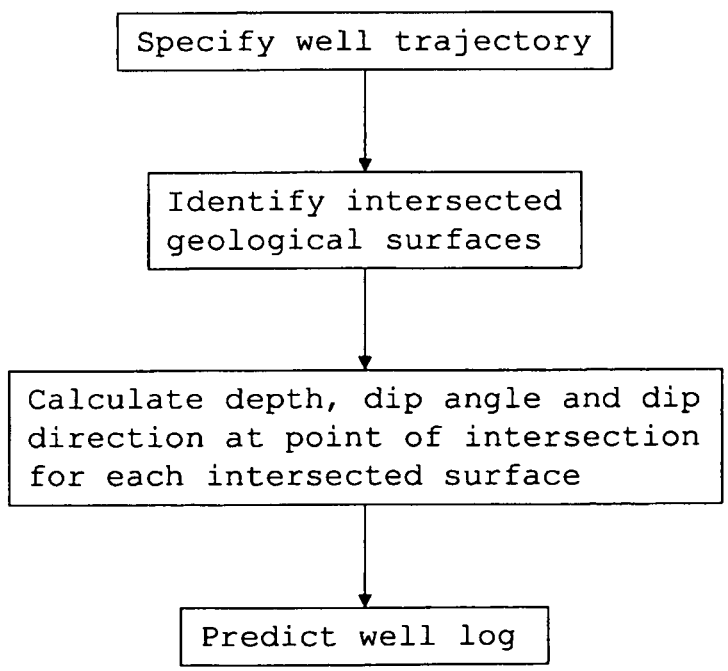
FIG. 2 shows a flow chart for a method of processing geological data.

FIG. 1 shows schematically a cross-section through a geological volume. The volume is populated by geological surfaces representative of strata horizons 1 and faults 2. The surfaces can be seismic-derived surfaces. A first step of the method is to specify a well trajectory 3 which extends through the volume and intersects a subset of the surfaces. Next, each surface which is intersected by the trajectory is identified. For each of these surfaces, the depth, the dip angle and the dip direction of the surface at the point of intersection with the trajectory are calculated. Finally, the calculated depths, dip angles and dip directions are combined in a predicted well log for the trajectory. These steps are shown schematically in the flow chart of FIG. 2.

Figure 3:
FIG. 3 shows schematically a predicted well log in the form of a tadpole plot.

FIG. 3 shows schematically a predicted well log in the form of a tadpole plot.

Figure 4:
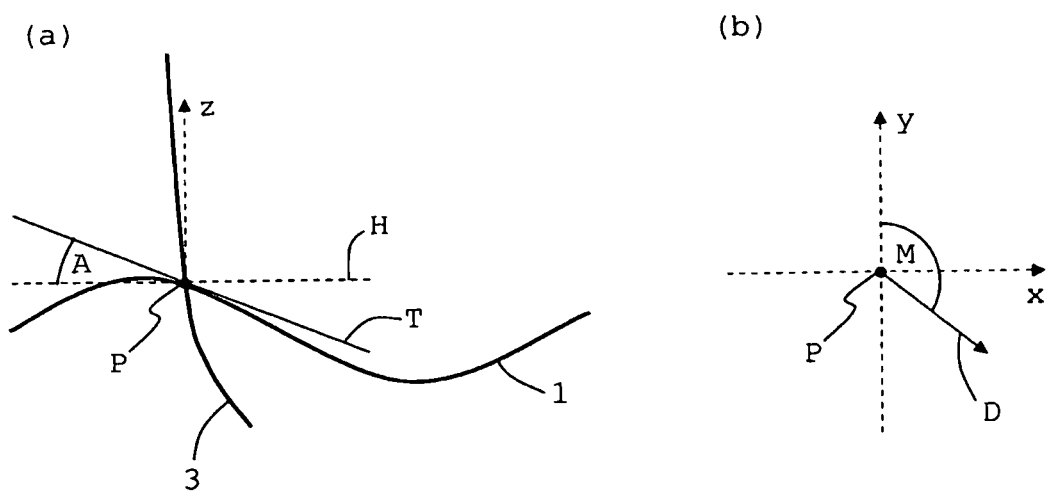
FIG. 4 shows schematic diagrams illustrating the calculation of (a) dip angle and (b) dip direction.

FIG. 4 shows schematically how (a) the dip angle and (b) the dip direction can be calculated for each intersected surface. A tangent plane T is constructed at the point P of intersection between an intersected surface 1 and the well trajectory 3. The dip angle A is then the angle below the horizontal H of the tangent plane, and the Dip direction D is the direction of maximum dip of the tangent plane projected onto the horizontal. The dip direction can alternatively be represented by a dip azimuth angle M. In FIG. 4, z is a direction normal to the horizontal, while x and y are orthogonal directions in the horizontal.

Results, e.g. in the form of a γ-ray log, from experimental well logs or MWD operations can be used to update the geological surfaces and provide an improved predicted well log. For example, a target reservoir may be situated beneath a salt dome. Such domes often have irregular boundaries, making it difficult to identify the reservoir in seismic data. However, once the boundaries of the dome have been determined from such results, the seismic data can be reanalysed to provide a better identification of the target reservoir and hence an improved predicted well log.

All references referred to above are hereby incorporated by reference.

The invention claimed is:

1. A method for controlling a drilling procedure to drill a well, the method including the steps of:
   carrying out a seismic survey which comprises imparting energy to the earth from at least one source location and receiving energy at a plurality of surface receiver locations at differing distances and azimuths from the source location;
   processing data from the seismic survey to determine properties of geological surfaces in a geological volume, wherein the geological surfaces include horizons and/or faults, and to identify a target reservoir;
   specifying a well trajectory for the well extending through the geological volume;

after specifying the well trajectory, identifying the geological surfaces within the volume intersected by the well trajectory;

for each intersected horizon or fault determined from the seismic survey performed at the surface receiver locations, determining the depth, the dip angle, and the dip direction of the horizon or fault at the point of intersection with the well trajectory;

converting the depths, dip angles, and dip directions of the intersected horizons and/or faults processed from the seismic survey data obtained from the surface receiver locations and the well trajectory into a predicted well log for the well trajectory;

after the well log is generated, drilling the well by controlling drilling equipment to follow the well trajectory through the horizons and/or faults intersecting the well trajectory;

providing the predicted well log in a graphically displayed tadpole plot to a controller to control the drilling procedure while drilling the well;

making measurements while drilling during the drilling procedure to identify boundaries of the horizons and/or faults; and reanalyzing the data from the seismic survey to update an identification of the target reservoir in the geological volume based on the identified boundaries from the while drilling measurements.

2. The method according to claim 1, further comprising:

correlating the predicted well log with the measurements while drilling; and using the correlation of the predicted well log with the measurements while drilling to control the drilling procedure.

3. A computer system for performing the method of claim 1.

4. A computer program product carrying a program for performing the method of claim 1.

5. A computer program for performing the method of claim 1.

6. The method according to claim 1, further comprising using the while drilling measurements to update the predicted well log.

7. The method according to claim 1, wherein controlling the drilling procedure comprises adjusting a drilling parameter of the drilling procedure.

8. The method according to claim 1, wherein the well trajectory passes through the target reservoir.

9. The method according to claim 1, wherein the geologic surfaces comprise a salt dome and the updating step includes updating a location of the target reservoir based on identified boundaries of the salt dome from the while drilling measurements.

10. The method according to claim 1, wherein determining the depth, the dip angle, and the dip direction includes using the properties of the geological surfaces determined from the seismic surface at the plurality of surface receiver locations to:

construct a tangent plane at a point of intersection between the fault or horizon and the well trajectory;

identify the dip angle below a horizontal and the tangent plane; and determine dip direction as a direction of maximum dip of the tangent plane projected onto the horizontal.

11. A method for controlling a drilling procedure to drill a well to a target reservoir in a geological volume, the method including the steps of:

carrying out a seismic survey which comprises imparting energy to the earth from at least one source location and receiving energy at a plurality of surface receiver locations at differing distances and azimuths from the source location;

processing data from the seismic survey to determine properties of geological surfaces in the geological volume, wherein the geological surfaces include horizons and/or faults;

specifying a proposed well trajectory for the well extending through the geological volume to the target reservoir;

after specifying the well trajectory, identifying the horizons and/or faults within the volume intersected by the proposed well trajectory;

for each intersected horizon or fault determined from the seismic survey performed at the surface receiver locations, determining the depth, the dip angle, and the dip direction of the horizon and/or fault at the point of intersection with the proposed well trajectory;

converting the depths, dip angles, and dip directions of the intersected horizons and/or faults processed from the seismic survey data obtained from the surface receiver locations and the proposed well trajectory into a predicted well log for the proposed well trajectory;

obtaining an experimental well log for a well having the well trajectory specified in the predicted well log and correlating the predicted well log with results from the experimental well log to select a drilling well trajectory;

interpreting the well log to identify any need for adjustment of the proposed well trajectory to a revised well trajectory for the well extending through the geological volume to the target reservoir to control the drilling procedure;

after the well log is generated, drilling the well by controlling drilling equipment to follow the revised well trajectory through the horizons and/or faults intersecting the revised well trajectory;

making measurements while drilling during the drilling procedure to identify boundaries of the horizons and/or faults; and reanalyzing the data from the seismic survey to update an identification of the target reservoir in the geological volume based on the identified boundaries from the while drilling measurements.

12. The method according to claim 11, further comprising:

using measurements from the drilling procedure to identify further drilling hazards; and adjusting the revised well trajectory based on the further drilling hazards.

* * * * *